United States Patent
Miller et al.

(10) Patent No.: US 6,938,139 B2
(45) Date of Patent: Aug. 30, 2005

(54) METHOD AND SYSTEM FOR DATA ELEMENT CHANGE ACROSS MULTIPLE INSTANCES OF DATA BASE CACHE

(75) Inventors: Lawrence Miller, New York, NY (US); Mike Moore, New York, NY (US); Zhengrong Chiu, Brooklyn, NY (US); Hansen Wang, Highland Park, NJ (US); Dave Chapman, New York, NY (US); Andy Peterson, Weehaken, NJ (US)

(73) Assignee: JP Morgan Chase Bank, New York, NY (US)

(*) Notice: Subject to any disclaimer, the term of this patent is extended or adjusted under 35 U.S.C. 154(b) by 0 days.

(21) Appl. No.: 10/065,337

(22) Filed: Oct. 4, 2002

(65) Prior Publication Data
US 2003/0236957 A1 Dec. 25, 2003

Related U.S. Application Data
(60) Provisional application No. 60/319,339, filed on Jun. 21, 2002.

(51) Int. Cl.[7] .............................................. G06F 12/00
(52) U.S. Cl. ..................... 711/163; 711/141; 711/152; 710/200; 710/220; 707/8; 707/201; 707/203
(58) Field of Search ................................. 711/141, 152, 711/163; 710/200, 220; 707/8, 201, 203

(56) References Cited

U.S. PATENT DOCUMENTS

| | | | | |
|---|---|---|---|---|
| 5,596,754 A | * | 1/1997 | Lomet ......................... | 710/200 |
| 6,021,470 A | * | 2/2000 | Frank et al. ................. | 711/138 |
| 6,122,674 A | | 9/2000 | Olnowich ..................... | 709/250 |
| 6,192,408 B1 | | 2/2001 | Vahalia et al. .............. | 709/229 |
| 6,199,141 B1 | | 3/2001 | Weinreb et al. ............. | 711/118 |
| 6,343,346 B1 | | 1/2002 | Olnowich ..................... | 711/142 |
| 6,584,548 B1 | * | 6/2003 | Bourne et al. .............. | 711/134 |
| 2002/0046326 A1 | | 4/2002 | Devereux .................... | 711/128 |

* cited by examiner

*Primary Examiner*—Donald Sparks
*Assistant Examiner*—Bao Q Truong
(74) *Attorney, Agent, or Firm*—Milbank, Tweed, Hadley & McCloy LLP (57) ABSTRACT

A method and system for updating and maintaining cache coherency across nodes in a cluster. The method uses a combination of read and write locks on the instances of the cache, with some embodiments using a master locking database. Periodic validations of timestamps are used to identify lack of coherency of the cache, such as resulting from a network failure.

34 Claims, 7 Drawing Sheets

METHOD AND SYSTEM FOR DATA ELEMENT CHANGE ACROSS MULTIPLE INSTANCES OF DATA BASE CACHE

BACKGROUND OF INVENTION

1. Field of the Invention

The invention pertains to the field of data base cache, and more particularly to cache management with data updates.

2. Background of the Related Art

Various types of database cache are known, with techniques for update or refresh of the cache upon a change in one of the data elements. Examples are J2EE Container Managed Persistence and products such as Persistence. However, these products do not provide a locking strategy that works at a logical transaction level. Most Container Managed Persistence mechanisms rely on network connectivity between the nodes to ensure cache integrity. Further, existing products are designed to work within a single cluster.

What is needed is a system and method for cache management across heterogeneous clusters.

The preceding description is not to be construed as an admission that any of the description is prior art to the present invention.

SUMMARY OF INVENTION

In one aspect, the invention provides a method and system for management of data cache. A database lock of a named cache is requested, the named cache is locked, a local lock of the named cache at a local node is acquired, a timestamp corresponding to the local lock is generated, a cache item of the named cache is invalidated in the local node, the local lock of the named cache is released, a message is sent to a remote node identifying the cache item of the named cache, an acknowledgment of the message is received from the remote node, an update of the cache item of the named cache is sent, the named cache is updated and the database lock of the named cache is released.

In another aspect, the invention provides a method and system for management of data cache. A cache miss of a cache item is identified, a read lock of a named cache is requested, the named cache including the cache item, the named cache is read locked, the cache item is requested from a master locking database, the cache item is received, and the read lock of the named cache is released.

In another aspect, the invention provides a method and system for management of data cache. A cache miss of a cache item is identified, a read lock of a global database is requested, the global database including the cache item, the global database is read locked, the cache item is requested from a master locking database, the cache item is received, and the read lock of the global database is released.

In another aspect, the invention provides a method and system for management of data cache. A predetermined event is determined to have occurred, a read lock of a named cache is requested, a timestamp is requested, an indication of a read lock of the named cache is received, a timestamp is received, the received timestamp is compared with a previous timestamp, responsive to the comparison, a predetermined action is performed, and the read lock of the named cache is released.

The specific aspects and advantages of the invention described and illustrated herein are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

The invention solves a problem of maintaining cache coherency in a distributed system with a central database server. The cache coherency mechanism ensures that updates are synchronous across all instances of the cache in the distributed system (i.e., that an update takes effect on all nodes in the system at the same time and no node is ever out of synchronization with another node.) In this way, the system is never in an inconsistent state. To accomplish this, the invention uses an integrated lock across threads, across Virtual Machines and across address spaces.

The invention has backup mechanisms in case of network failures and also allows the system to be brought back up into a consistent state after a complete failure. The invention allows caches to be taken down and brought up in different address spaces at different times but does not dictate the way that persistence is implemented (i.e., this mechanism can be used on top of existing code, allowing custom cache flushing mechanisms).

Use of a master database in one embodiment of the invention provides a way to enforce synchronization across the system using transactionality. Other known invalidation mechanisms usually either implement a custom invalidation mechanism (such as a send/ack invalidation mechanism), or use some form of global lock. The present invention is generally easier than implementing a custom global cache synchronization mechanism. The cache implementation of the invention also provides an easy way to integrate the distributed cache with other transactional database updates. This design maps cache invalidations against logical data groupings that are different than the physical table structure of the database. The synchronization mechanism also avoids causality race conditions (sequencing, etc).

Figure 1:
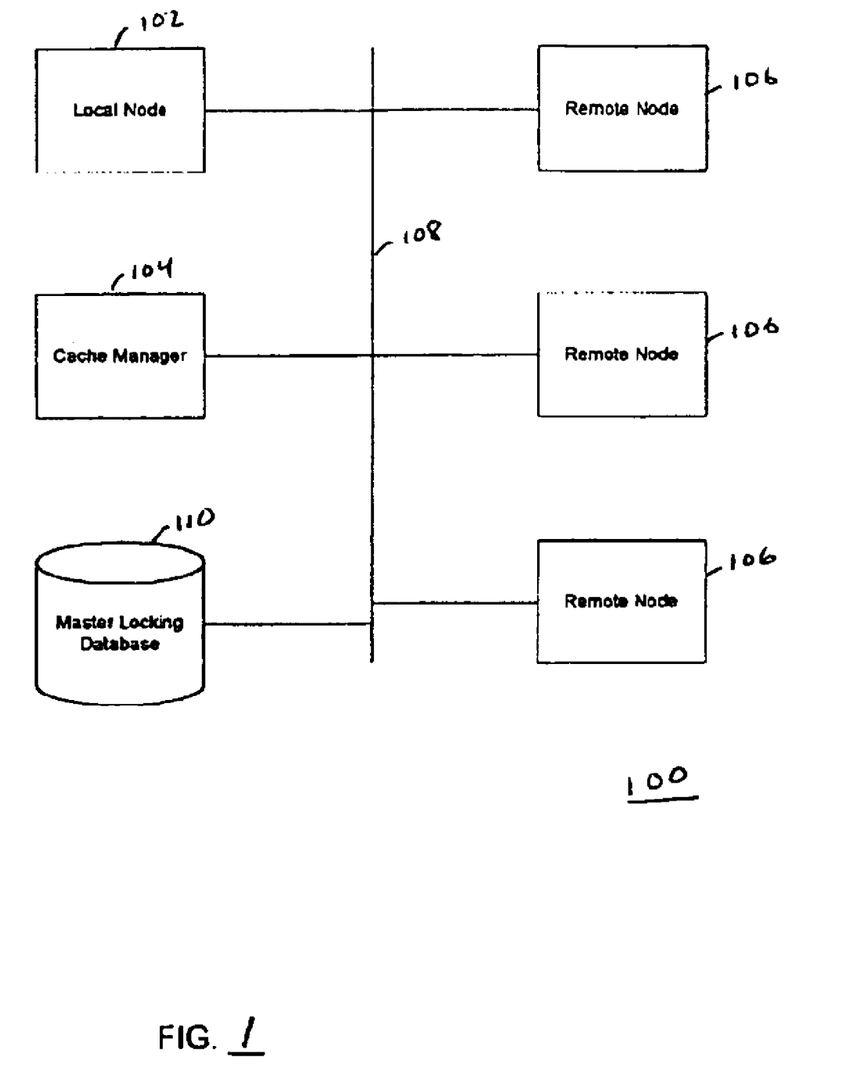
FIG. 1 illustrates a system according to one embodiment of the invention.

Referring first to FIG. 1, system 100 of the invention includes local node 102, cache manager 104 and remote node(s) 106. One embodiment also includes a primary or master locking database 110. Network 108 interconnects local node 102, cache manager 104 and remote node(s) 106. Where system 100 includes primary database 110, database 110 is also interconnected to the other elements of system 100 by network 108. Network 108 is any of a number of different types of wired and wireless networks, including local area network (LAN) and wide area network (WAN).

Although not illustrated in FIG. 1, each of local node 102, cache manager 104, remote node(s) 106 and database 110 include one or more fixed and removable software code storage media, processor and memory to run the software code as well as input/output devices and network interface devices.

Figure 2:
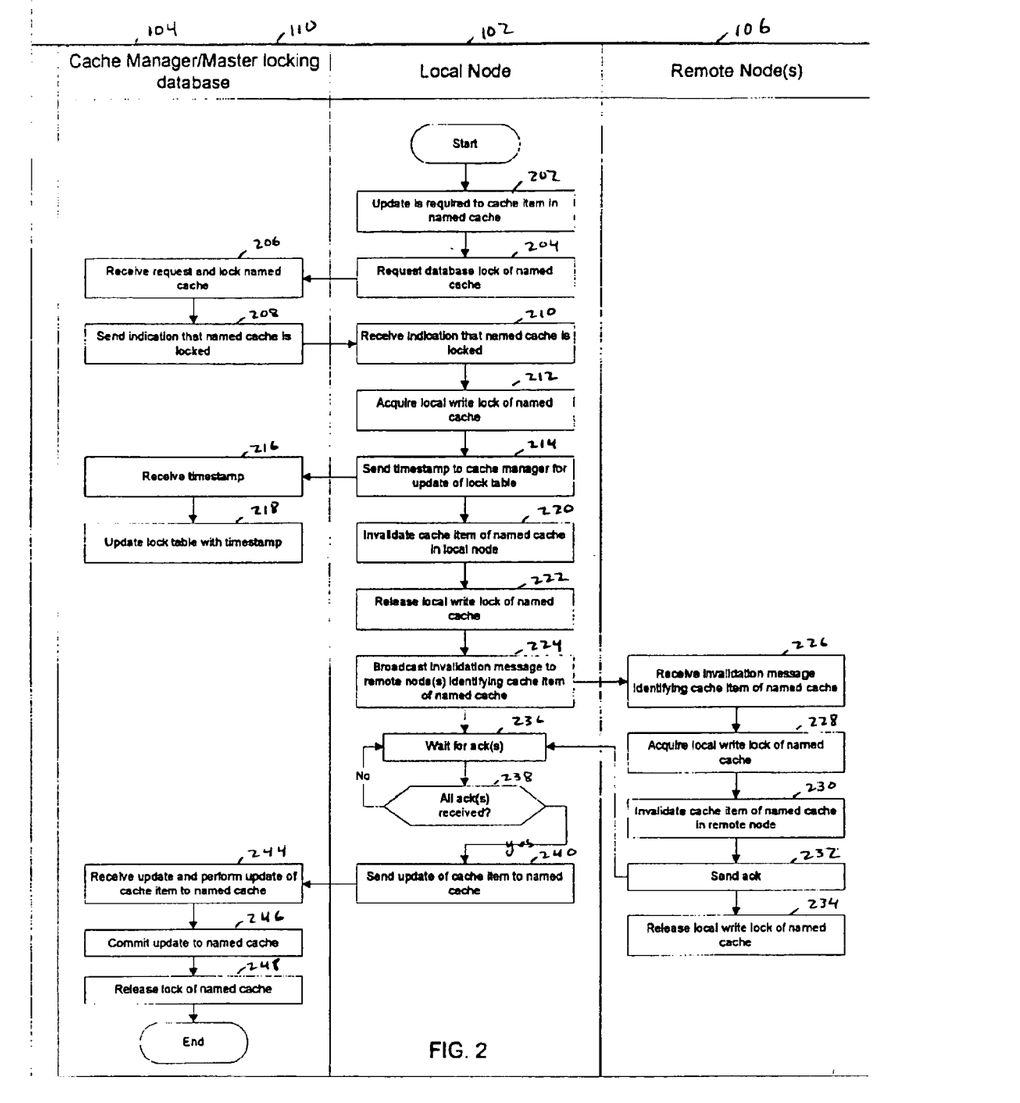
FIG. 2 illustrates steps in a method of one embodiment of the invention.

Steps in one embodiment of the invention are illustrated in FIG. 2. At step 202, local node 102 determines that a cache element in a named cache requires modification. The need for modification may include the need for an update, or a data change.

At step 204, local node 102 requests a database lock of the named cache. It is also possible that the request for a database lock at step 204 is a request for a global lock of the master database.

At step 206, cache manager 104 receives the request for a database lock of the named cache (or global lock of the master database), and locks the named cache (or master database).

At step 208, cache manager 104 sends an indication to local node 102 that the named cache (or master database) is locked.

At step 210, local node 102 receives the indication from cache manager 104 that the named cache (or master database) is locked.

At step 212, local node 102 acquires a local write lock of the named cache. Although called a write lock, the write lock includes a read lock of the named cache.

At step 214, local node 102 sends a timestamp to cache manager 104 for use in an update of the lock table.

At step 216, cache manager 104 receives the timestamp, and at step 218 cache manager 104 updates the lock table with the timestamp from local node 102. It is also possible that the timestamp is merely requested by local node 102 and cache manager 104 provides the timestamp.

After sending the timestamp at step 214, then at step 220, local node 102 invalidates the cache item of the named cache that is held by local node 102.

At step 222, after invalidating the cache item, local node 102 releases the write lock of the named cache.

At step 224, local node 102 broadcasts an invalidation message to all remote nodes 106, identifying the cache item of the named cache.

At step 226, each remote node 106 receives the broadcast invalidation message, identifying the cache item of the named cache.

At step 228, each remote node 106 acquires a local write lock of the named cache in their own remote node.

At step 230, each remote node 106 invalidates the cache item of the named cache in their own remote node.

At step 232, after invalidating the cache item of the named cache in their own remote node, each remote node 106 sends an acknowledgment (ack) message to local node 102.

At step 234, each remote node 106 releases the local write lock of the named cache in the remote node.

At step 236 and 238, after broadcasting the invalidation message at step 223, local node 102 waits for acknowledgment from each of the remote nodes 106.

It is possible that there is some delay in sending the acknowledgment (ack) from each remote node, or that the network connection to one or more of the remote nodes is lost and therefore the remote node does not receive the broadcast message, or is unable to send an acknowledgment. Therefore, although not illustrated, in one embodiment, a time-out timer may limit the length of time that local node 102 waits at steps 236 and 238 for all acknowledgments.

At step 240, after all acknowledgments have been received from remote nodes 106, local node 102 sends the update of the cache item in the named cache to master locking database 110.

At step 244, master locking database 110 receives the update and performs the update to cache item of the named cache in the master locking database.

At step 246, master locking database 110 commits the update of the cache item to the named cache of the master database.

At step 248, after confirmation of the commit at step 246, cache manager 104 releases the lock of the named cache (or global database).

As illustrated in FIG. 2, once the steps are complete, local node 102 and remote node(s) 106 have invalidated the cache item of the named cache in the remote nodes, but have not updated the cache item of the named cache in the local node or remote nodes. Therefore, when a request is made to either the local node 102 or the remote node(s) 106 for the cache item of the named cache, the local node or remote node generates a cache miss and must make a call to master database 110.

Figure 3:
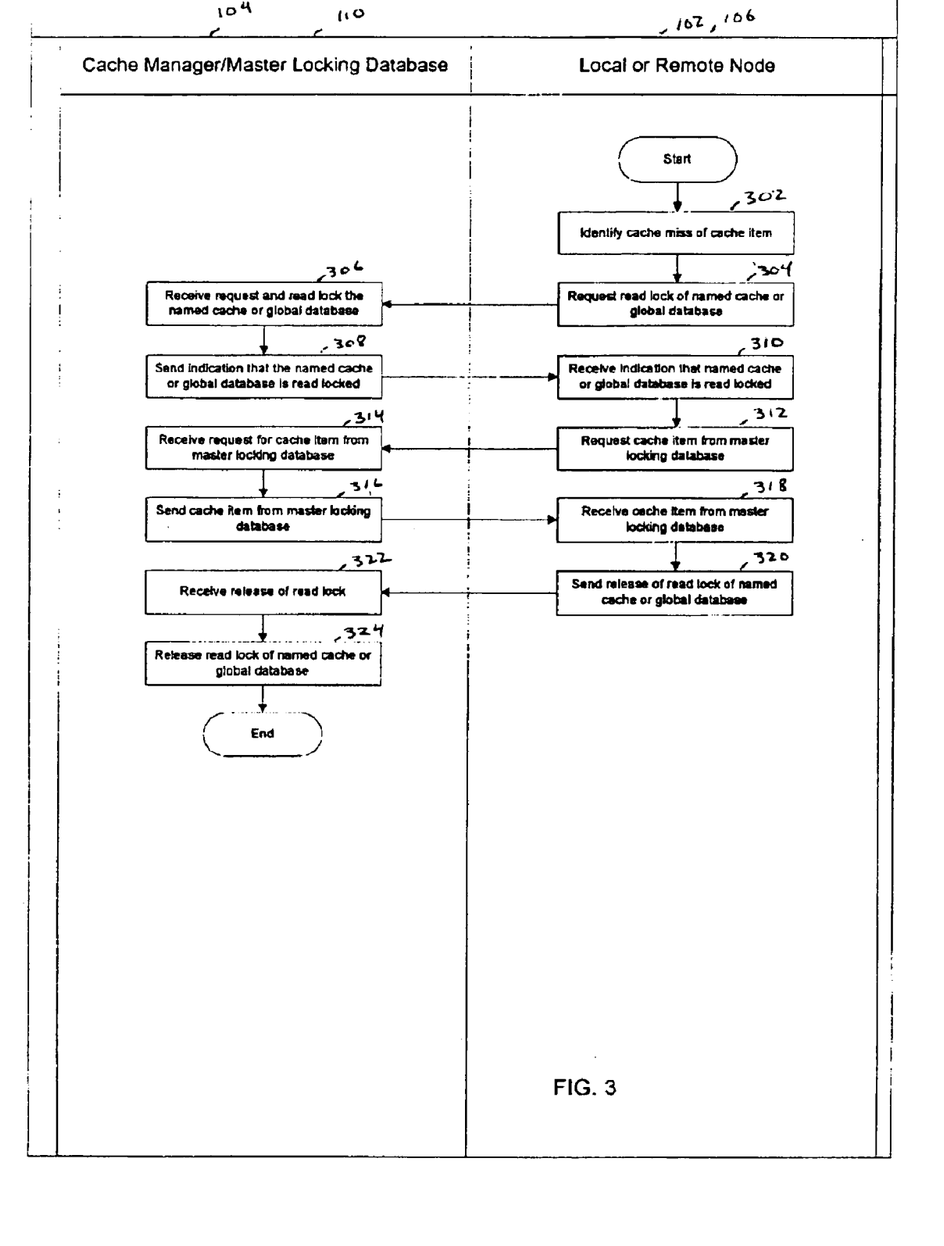
FIG. 3 illustrates steps in a method of one embodiment of the invention.

Referring now to FIG. 3, steps for dealing with a cache miss are illustrated. At step 302, the node (either the local node 102 or remote node 106 that generated the cache miss), identifies a cache miss of the cache item.

At step 304, the node (102 or 106) requests a read lock of the named cache (or global database).

At step 306, cache manager 104 receives the request, and read locks the named cache (or global database).

At step 308, cache manager 104 sends an indication to the node (102 or 106) that the named cache (or global database) is read locked.

At step 310, the node (102 or 106) receives an indication that the named cache (or global database) is read locked.

At step 312, the node (102 or 106) requests the cache item from master locking database 110.

At step 314, master locking database 110 receives the request for the cache item, and at step 316, master locking database 110 sends the cache item from the master locking database 110.

At step 318, the node (102 or 106) receives the cache item from master locking database 110.

At step 320, the node (102 or 106) sends a release of the read lock of the named cache (or global database) to cache manager 104.

At step 322, cache manager 104 receives the release of the read lock, and at step 324 releases the read lock of the named cache (or global database).

After completing the steps illustrated in FIG. 3, the node that experienced a cache miss of the cache item in the named cache has received an update of the cache item.

Figure 4:
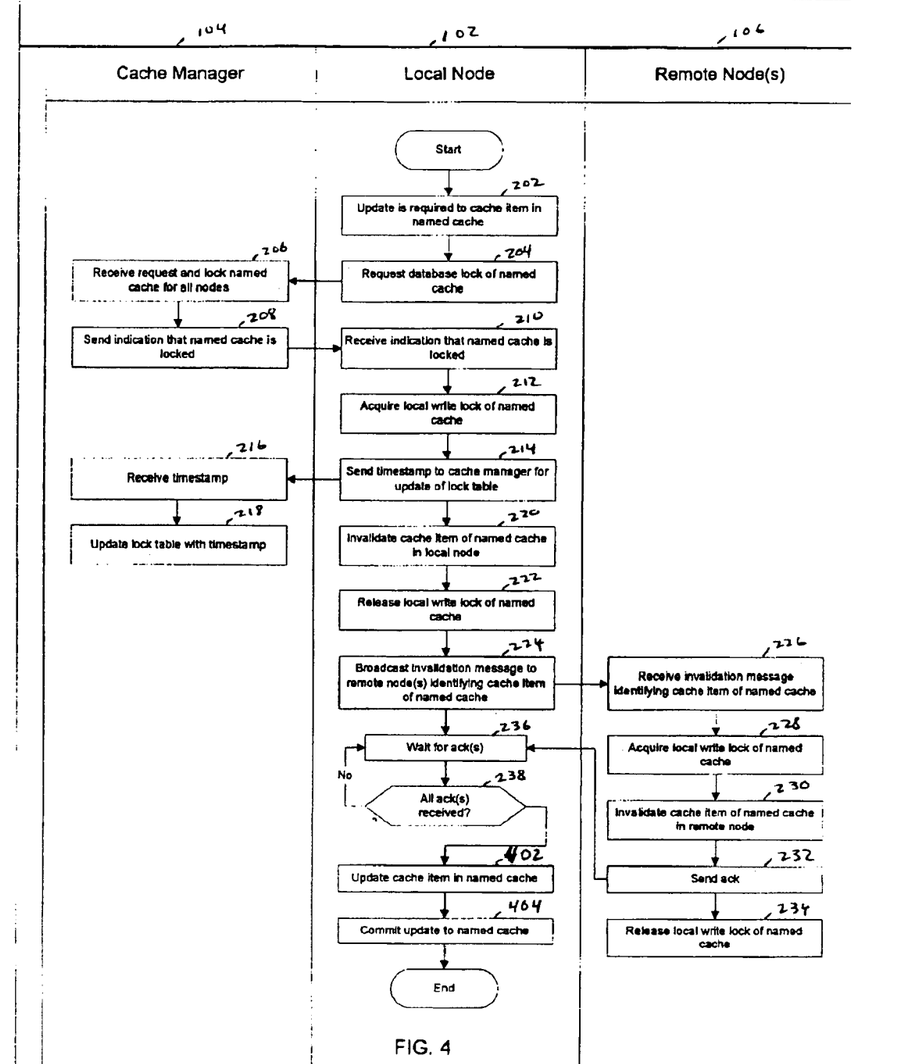
FIG. 4 illustrates steps in a method of one embodiment of the invention.

Referring now to FIG. 4, an embodiment of the invention includes cache manager 104, but does not include a separate master locking database 110. In this embodiment, the named cache is replicated and distributed among local node 102 and remote nodes 106.

Steps 202 through 238 are similar to or the same as the correspondingly numbered steps of FIG. 2.

At step 402, local node 102 updates the cache item of the named cache in the local node, and at step 404, local node 102 commits the update to the named cache and ends.

Figure 5:
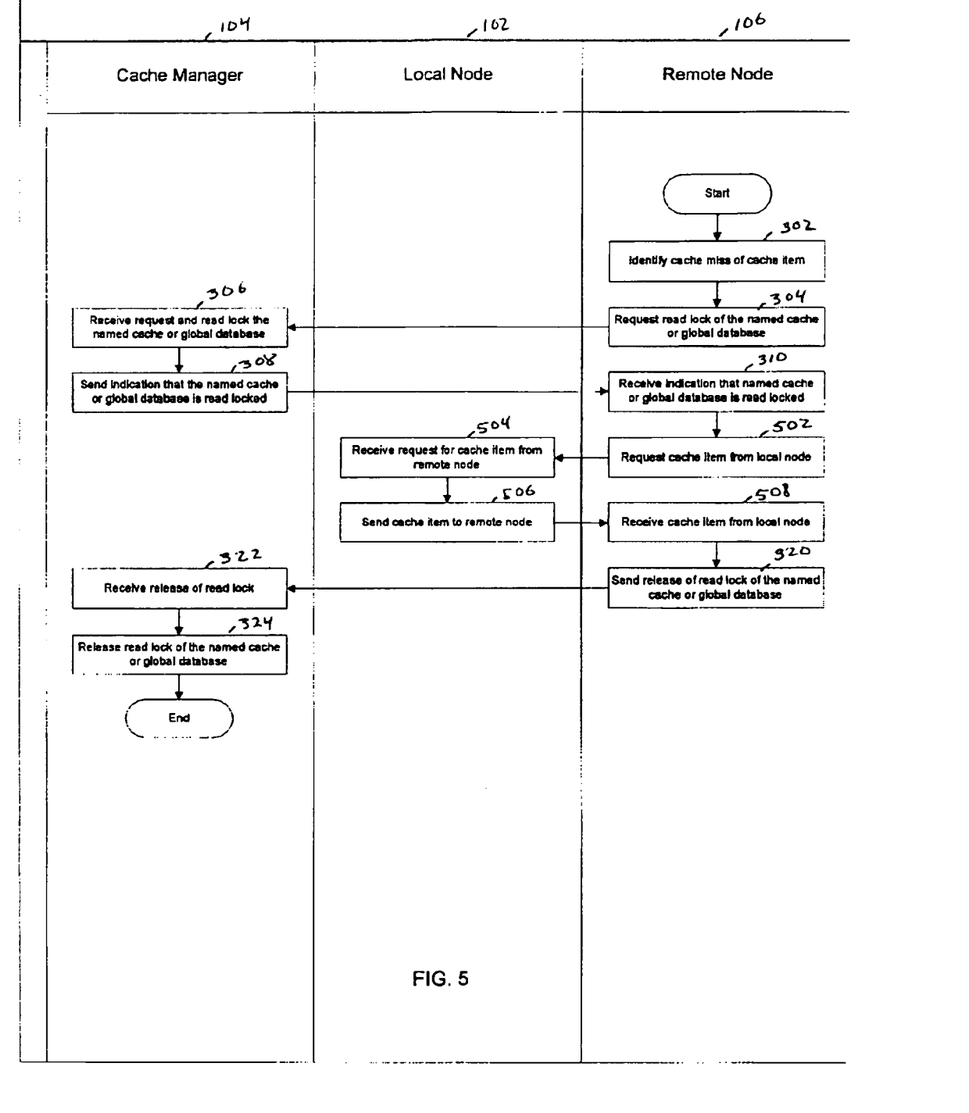
FIG. 5 illustrates steps in a method of one embodiment of the invention.

Referring now to FIG. 5, which illustrates an embodiment for handing a cache when there is a cache manager but no separate master locking database. In this embodiment, the named cache is replicated and distributed among local node 102 and remote nodes 106. In the example illustrated in FIG. 5, the update of the cache item is made to local node 102, and remote node 106 experiences a cache miss.

Steps 302 through 310 and 320 through 324 are the same or similar to the similarly number steps of FIG. 3.

At step 502, remote node 106, which experienced the cache miss, requests the cache item from local node 102.

At step 504, local node 102 receives the request for the cache item, and at step 506, sends the requested cache item to remote node 106.

At step 508, remote node 106 receives the cache item from the local node and, although not illustrated in the figure, updates the cache item in the local cache of the remote node.

Figure 6:
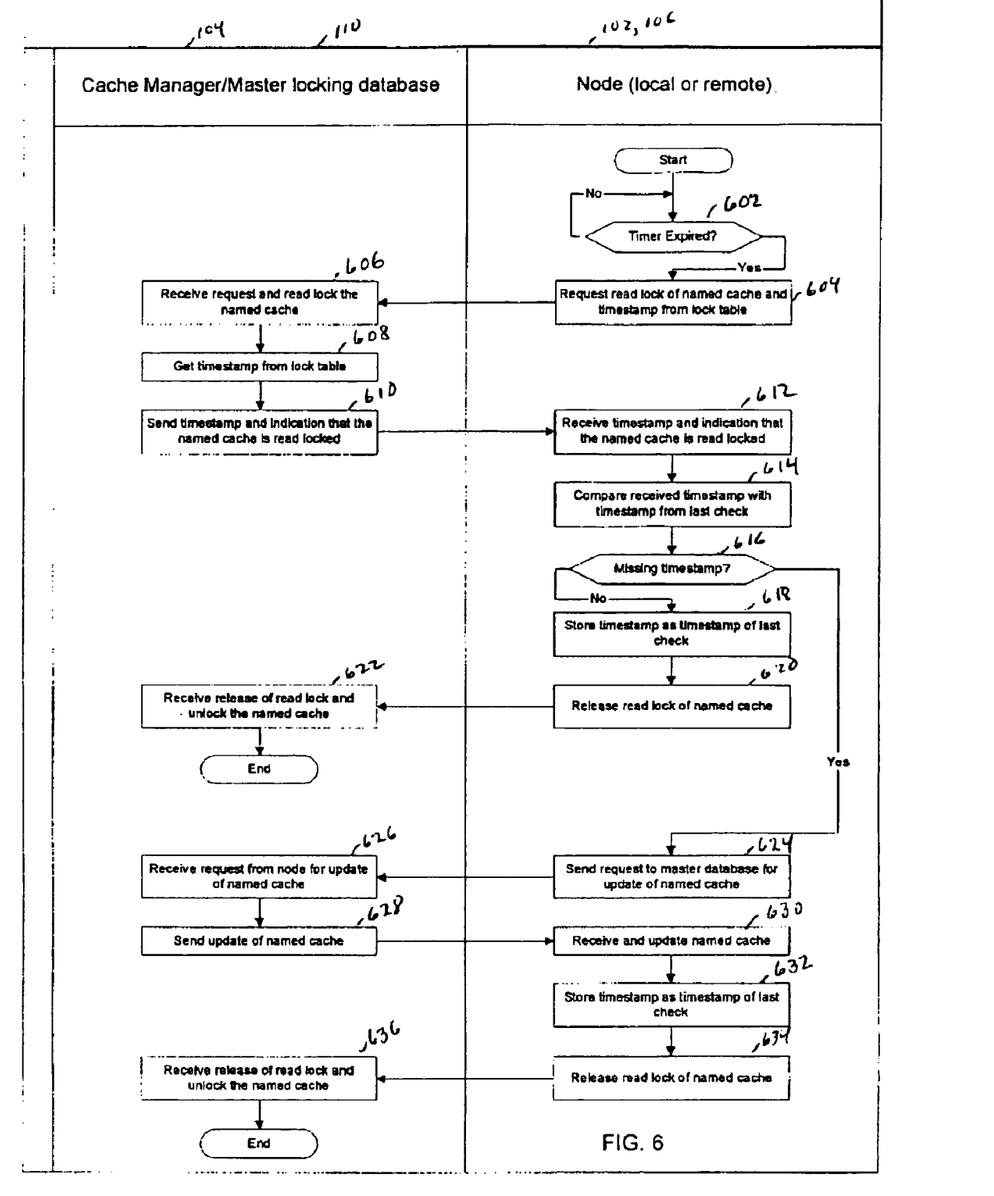
FIG. 6 illustrates steps in a method of one embodiment of the invention.

Referring now to FIG. 6, an embodiment of the invention helps to ensure that if a node becomes disconnected from the network, or misses a cache item invalidation, that failure will be detected and can be resolved. The steps illustrated in FIG. 6 are performed on a regular basis by each node.

At step 602, the node determines whether a previously set countdown timer of a predetermined length has expired, looping if the timer has not expired.

At step 604, when the countdown timer has expired, the node sends a request to cache manager 104 for a read lock of the named cache and the most current timestamp in the lock table.

At step 606, cache manager 104 receives the request for a read lock, and read locks the named cache.

At step 608, cache manager 104 gets the most current timestamp in the lock table.

At step 610, cache manager 104 sends the timestamp and an indication that the named cache is read locked to the requesting node.

At step 612, the node receives the indication that the named cache is read locked along with the timestamp.

At step 614, the node compares the timestamp received from the cache manager with the timestamp from the previous check.

At step 616, the node determines whether a timestamp is missing.

If, at step 616, the node determines that no timestamp is missing, then at step 618, the node stores the timestamp, received at step 612 as the timestamp of the last check.

At step 620, the node sends a message to the cache manager releasing the read lock of the named cache.

At step 622, in response to the message releasing the read lock of the named cache, cache manager 104 releases the read lock of the named cache and ends, or loops by re-starting the count-down timer that is monitored at step 602.

If at step 616, the node determines that a timestamp is missing, then at step 624, the node sends a request to master locking database 110 for an update of the named cache.

At steps 626, 628, master locking database 110 receives the request for an update of the named cache and sends the update to the node.

At step 630, the node receives the requested update and updates the named cache.

At steps 632 through 636, the node stores the timestamp and releases the read lock of the named cache, just as described with reference to steps 618 through 622.

Figure 7:
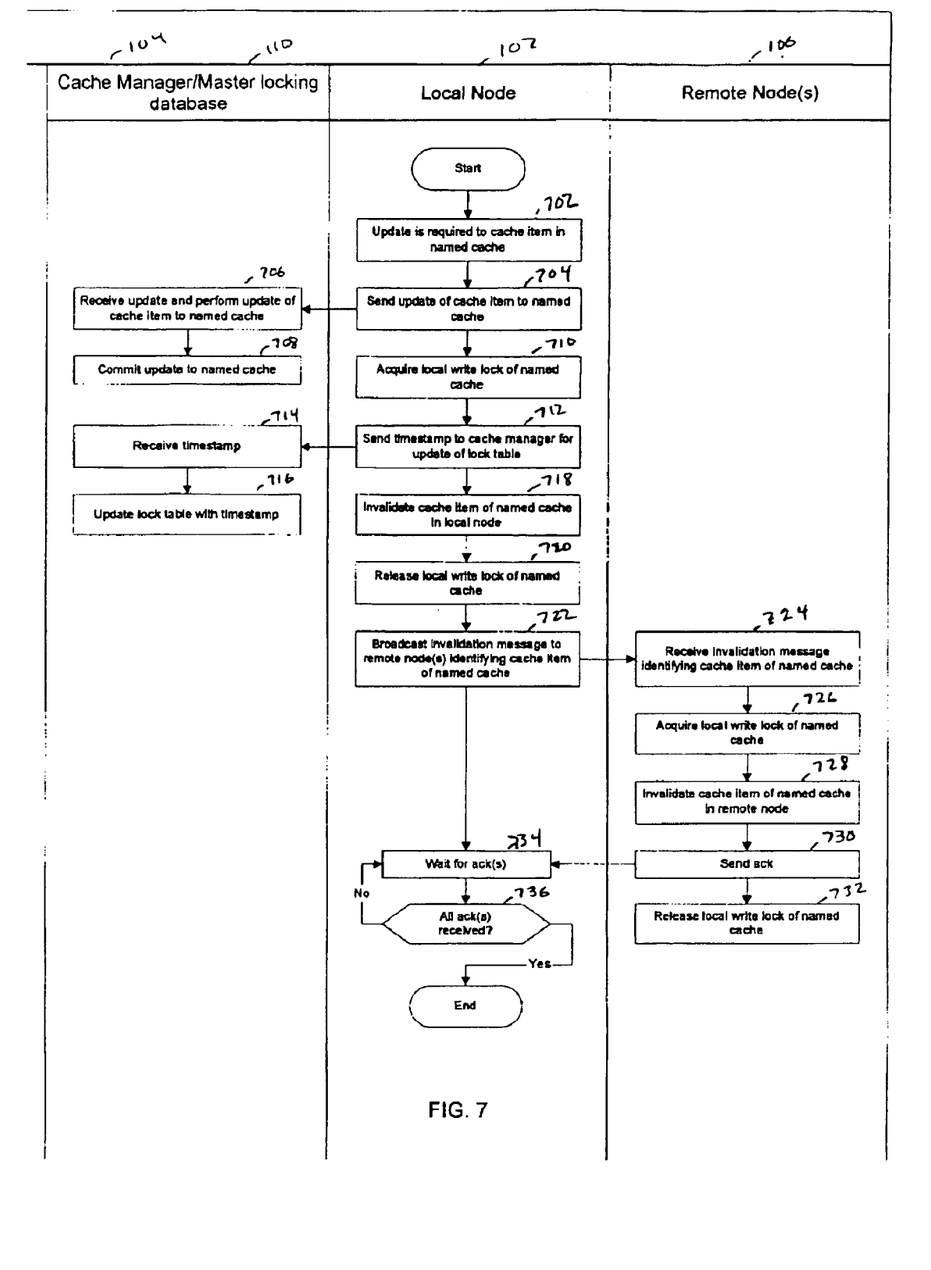
FIG. 7 illustrates steps in a method of one embodiment of the invention.

Referring now to FIG. 7, an embodiment of the invention reorders some of the previously described steps and deletes some of the steps.

At step 702, local node 102 determines that a cache element in a named cache requires modification. The need for modification may include the need for an update, or a data change.

At step 704, local node 102 sends the update of the cache item in the named cache to master locking database 110.

At step 706, master locking database 110 receives the update and performs the update to cache item of the named cache in the master locking database.

At step 708, master locking database 110 commits the update of the cache item to the named cache of the master database.

At step 710, local node 102 acquires a local write lock of the named cache. Although called a write lock, the write lock includes a read lock of the named cache.

At step 712, local node 102 sends a timestamp to cache manager 104 for use in an update of the lock table.

At step 714, cache manager 104 receives the timestamp, and at step 716 cache manager 104 updates the lock table with the timestamp from local node 102.

After sending the timestamp at step 712, then at step 718, local node 102 invalidates the cache item of the named cache that is held by local node 102.

At step 720, after invalidating the cache item, local node 102 releases the write lock of the named cache.

At step 722, local node 102 broadcasts an invalidation message to all remote nodes 106, identifying the cache item of the named cache.

At step 724, each remote node 106 receives the broadcast invalidation message, identifying the cache item of the named cache.

At step 726, each remote node 106 acquires a local write lock of the named cache in their own remote node.

At step 728, each remote node 106 invalidates the cache item of the named cache in their own remote node.

At step 730, after invalidating the cache item of the named cache in their own remote node, each remote node 106 sends an acknowledgment (ack) message to local node 102.

At step 732, each remote node 106 releases the local write lock of the named cache in the remote node.

At steps 734 and 736, after broadcasting the invalidation message at step 722, local node 102 waits for acknowledgment from each of the remote nodes 106.

The process is complete once all of the remote nodes have acknowledged the invalidation message.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

What is claimed is:

1. A method for cache management comprising:
    requesting database lock of a named cache;
    locking the named cache and providing an indication that the named cache is locked;
    acquiring a local lock of the named cache at a local node;
    generating a timestamp corresponding to the local lock;
    invalidating a cache item of the named cache in the local node;
    releasing the local lock of the named cache;
    sending a message to a remote node identifying the cache item of the named cache;
    receiving acknowledgment from the remote node;
    sending an update of the cache item of the named cache;
    updating the named cache; and
    releasing the database lock of the named cache.

2. A method according to claim 1, further comprising:
    acquiring a local lock of the named cache at the remote node.

3. A method according to claim 1, further comprising:
    invalidating the cache item of the named cache at the remote node.

4. A method according to claim 1, further comprising:
    acknowledging the message identifying the cache item of the named cache.

5. A method according to claim 1, further comprising:
    releasing the local lock of the named cache at the remote node.

6. A method according to claim 1, wherein locking the named cache locks the named cache for all nodes.

7. A method for cache management in a distributed computer system comprising:
    identifying at a first computer of the distributed computer system a cache miss of a cache item;
    sending a request for a read lock of a named cache from the first computer to a second computer of the distributed computer system, the named cache including the cache item;
    read locking at the second computer the named cache;
    requesting the cache item from a master locking database of the distributed computer system, wherein the first computer, the second computer and the master locking database are individual nodes of the distributed computer system;
    receiving at the first computer the cache item; and
    sending a release of the read lock of the named cache from the first computer to the second computer.

8. A method according to claim 7, further comprising:
    sending an indication from the second computer to the first computer that the named cache is read locked.

9. A method according to claim 8, further comprising:
    sending the cache item from the master locking database to the first computer.

10. A method according to claim 7, wherein the first computer is a local node.

11. A method according to claim 7, wherein the first computer is a remote node.

12. A method according to claim 7, wherein the second computer is a cache manager.

13. A method for cache management in a distributed computer system comprising:
    identifying at a first computer of the distributed computer system a cache miss of a cache item;
    sending a request for a read lock of a global database from the first computer to a second computer of the distributed computer system, the global database including the cache item;
    read locking at the second computer the global database;
    requesting the cache item from a master locking database of the distributed computer system, wherein the first computer, the second computer and the master locking database are individual nodes of the distributed computer system;
    receiving at the first computer the cache item; and
    sending a release of the read lock of the global database from the first computer to the second computer.

14. A method for cache management in a distributed computer system comprising:
    determining at a first computer of the distributed computer system that a predetermined event has occurred;
    sending a request for a read lock of a named cache from the first computer to a second computer of the distributed computer system;
    requesting at the first computer a timestamp;
    receiving at the first computer an indication of a read lock of the named cache;
    receiving at the first computer a timestamp;
    comparing at the first computer the received timestamp with a previous timestamp;
    responsive to the comparison, performing at the first computer a predetermined action; and
    sending a release of the read lock of the named cache from the first computer to the second computer.

15. A method according to claim 14, wherein the predetermined action comprises storing at the first computer the received timestamp.

16. A method according to claim 14, wherein the predetermined action comprises sending a request for an update of the named cache from the first computer to the second computer.

17. A method according to claim 14, wherein the predetermined action comprises receiving at the first computer an update of the named cache.

18. A method according to claim 14, wherein the first computer is a local node.

19. A method according to claim 14, wherein the first computer is a remote node.

20. A method according to claim 14, wherein the second computer is a cache manager.

21. A method for cache management comprising:
    determining at a local node that an update is required for a cache item in a named cache;
    sending a request for a database lock of the named cache from a local node to a cache manager;
    receiving the request for a database lock at the cache manager;
    locking the database of the named cache;
    sending an indication that the database of the named cache is locked from the cache manager to the local node;
    receiving the indication that the database of the named cache is locked at the local node;

acquiring at the local node a local write lock of the named cache;
sending a timestamp from the local node to the cache manager;
receiving the timestamp at the cache manager, updating a lock table with the timestamp;
invalidating at the local node the cache item of the named cache;
releasing the local write lock of the named cache;
sending a message to invalidate the cache item of the named cache from the local node to a second node;
receiving the message to invalidate at the second node acquiring at the second node a remote write lock of the named cache;
invalidating at the second node the cache item of the named cache;
sending an acknowledgment of the message to invalidate from the second node to the local node;
releasing the remote write lock of the named cache at the second node;
receiving the acknowledgment of the message to invalidate at the local node;
determining that no further acknowledgments of the message to invalidate are expected at the local node;
sending an update of the cache item of the named cache from the local node;
receiving the update of the cache item and updating the cache item; and
releasing the database lock of the named cache.

22. A method for cache management in a distributed computer system comprising:
identifying a cache miss of a cache item at a local node of the distributed computer system;
sending a request for a read lock of a named cache from the local node to a cache manager of the distributed computer system;
receiving the request for a read lock of the named cache at the cache manager;
read locking the named cache at the cache manager;
sending an indication that the named cache is read locked from the cache manager to the local node;
receiving the indication that the named cache is read locked at the local node;
requesting the cache item from a master locking database of the distributed computer system, wherein the first computer, the second computer and the master locking database are individual nodes of the distributed computer system;
receiving the request for the cache item;
sending the cache item to the local node;
receiving the cache item at the local node;
sending a release of the read lock of the named cache from the local node to the cache manager;
receiving the release of the read lock of the named cache at the cache manager; and
releasing the read lock of the named cache.

23. A computer readable medium having computer executable program code stored thereon, the code for cache management, the code comprising:
code to request a database lock of a named cache;
code to lock the named cache and provide an indication that the named cache is locked;
code to acquire a local lock of the named cache at a local node;
code to generate a timestamp corresponding to the local lock;
code to invalidate a cache item of the namedvache in the local node;
code to release the local lock of the named cache;
code to send a message to a remote node identifying the cache item of the named cache;
code to receive acknowledgment from the remote node;
code to send an update of the cache item of the named cache;
code to update the named cache; and
code to release the database lock of the named cache.

24. A programmed computer for cache management, comprising:
a memory having at least one region for storing computer executable program code; and
a processor for executing the program code stored in memory, wherein the program code comprises:
code to request a database lock of a named cache;
code to lock the named cache and provide an indication that the namedcache is locked;
code to acquire a local lock of the named cache at a local node;
code to generate a timestamp corresponding to the local lock;
code to invalidate a cache item of the named cache in the local node;
code to release the local lock of the named cache;
code to send a message to a remote node identifying the cache item of the named cache;
code to receive acknowledgment from the remote node;
code to send an update of the cache item of the named cache;
code to update the named cache; and
code to release the database lock of the named cache.

25. A computer readable medium having computer executable program code stored thereon, the code for cache management in a distributed computer system, the code comprising:
code to identify at a first computer of the distributed computer system a cache miss of a cache item;
code to send a request for a read lock of a named cache from the first computer to a second computer of the distributed computer system, the named cache including the cache item;
code to read lock at the second computer the named cache;
code to request the cache item from a master locking database of the distributed computer system, wherein the first computer, the second computer and the master locking database are individual nodes of the distributed computer system;
code to receive at the first computer the cache item; and
code to send a release of the read lock of the named cache from the first computer to the second computer.

26. A programmed computer for cache management in a distributed computer system, comprising:
a memory having at least one region for storing computer executable program code; and
a processor for executing the program code stored in memory, wherein the program code comprises:

code to identify at a first computer of the distributed computer system a cache miss of a cache item;

code to send a request for a read lock of a named cache from the first computer to a second computer of the distributed computer system, the named cache including the cache item;

code to read lock at the second computer the named cache;

code to request the cache item from a master locking database of the distributed computer system, wherein the first computer, the second computer and the master locking database are individual nodes of the distributed computer system;

code to receive at the first computer the cache item; and code to send a release of the read lock of the named cache from the first computer to the second computer.

27. A computer readable medium having computer executable program code stored thereon, the code for cache management in a distributed computer system, the code comprising:

code to identify at a first computer of the distributed computer system a cache miss of a cache item;

code to send a request for a read lock of a global database from the first computer to a second computer of the distributed computer system, the global database including the cache item;

code to read lock at the second computer the global database;

code to request the cache item from a master locking database of the distributed computer system, wherein the first computer, the second computer and the master locking database are individual nodes of the disbibuted computer system;

code to receive at the first computer the cache item; and code to send a release of the read lock of the global database from the first computer to the second computer.

28. A programmed computer for cache management in a distributed computer system, comprising:

a memory having at least one region for storing computer executable program code; and a processor for executing the program code stored in memory, wherein the program code comprises:

code to identify at a first computer of the distributed computer system a cache miss of a cache item;

code to send a request for a read lock of a global database from the first computer to a second computer of the distributed computer system, the global database including the cache item;

code to read lock at the second computer the global database;

code to request the cache item from a master locking database of the distributed computer system, wherein the first computer, the second computer and the master locking database are individual nodes of the distributed computer system;

code to receive at the first computer the cache item; and code to send a release of the read lock of the global database from the first computer to the second computer.

29. A computer readable medium having computer executable program code stored thereon, the code for cache management in a distributed computer system, the code comprising:

code to determine at a first computer of the distributed computer system that a predetermined event has occurred;

code to send a request for a read lock of a named cache from the first computer to a second computer of the distributed computer system;

code to request at the first computer a timestamp;

code to receive at the first computer an indication of a read lock of the named cache;

code to receive at the first computer a timestamp;

code to compare at the first computer the received timestamp with a previous timestamp;

code to responsive to the comparison, to perform at the first computer a predetermined action; and code to send a release of the read lock of the named cache from the first computer to the second computer.

30. A programmed computer for cache management in a distributed computer system, comprising:

a memory having at least one region for storing computer executable program code; and a processor for executing the program code stored in memory, wherein the program code comprises:

code to determine at a first computer of the distributed computer system that a predetermined event has occurred;

code to send a request for a read lock of a named cache from the first computer to a second computer of the distributed computer system;

code to request at the first computer a timestamp;

code to receive at the first computer an indication of a read lock of the named cache;

code to receive at the first computer a timestamp;

code to compare at the first computer the received timestamp with a previous timestamp;

code to responsive to the comparison, to perform at the first computer a predetermined action; and code to send a release of release the read lock of the named cache from the first computer to the second computer.

31. A computer readable medium having computer executable program code stored thereon, the code for cache management, the code comprising:

code to determine at a local node that an update is required for a cache item in a named cache;

code to send a request for a database lock of the named cache from a local node to a cache manager;

code to receive the request for a database lock at the cache manager;

code to lock the database of the named cache;

code to send an indication that the database of the named cache is locked from the cache manager to the local node;

code to receive the indication that the database of the named cache is locked at the local node;

code to acquire at the local node a local write lock of the named cache;

code to send a timestamp from the local node to the cache manager;

code to receive the timestamp at the cache manager, updating a lock table with the timestamp;

code to invalidate at the local node the cache item of the named cache;

code to release the local write lock of the named cache;

code to send a message to invalidate the cache item of the named cache from the local node to a second node;

code to receive the message to invalidate at the second node acquiring at the second node a remote write lock of the named cache;

code to invalidate at the second node the cache item of the named cache;

code to send an acknowledgment of the message to invalidate from the second node to the local node;

code to release the remote write lock of the named cache at the second node;

code to receive the acknowledgment of the message to invalidate at the local node;

code to determine that no further acknowledgments of the message to invalidate are expected at the local node;

code to send an update of the cache item of the named cache from the local node;

code to receive the update of the cache item and updating the cache item; and code to release the database lock of the named cache.

32. A programmed computer for cache management, comprising:

a memory having at least one region for storing computer executable program code; and a processor for executing the program code stored in memory, wherein the program code comprises:

code to determine at a local node that an update is required for a cache item in a named cache;

code to send a request for a database lock of the named cache from a local node to a cache manager;

code to receive the request for a database lock at the cache manager;

code to lock the database of the named cache;

code to send an indication that the database of the named cache is locked from the cache manager to the local node;

code to receive the indication that the database of the named cache is locked at the local node;

code to acquire at the local node a local write lock of the named cache;

code to send a timestamp from the local node to the cache manager;

code to receive the timestamp at the cache manager; updating a lock table with the timestamp;

code to invalidate at the local node the cache item of the named cache;

code to release the local write lock of the named cache;

code to send a message to invalidate the cache item of the named cache from the local node to a second node;

code to receive the message to invalidate at the second node acquiring at the second node a remote write lock of the named cache;

code to invalidate at the second node the cache item of the named cache;

code to send an acknowledgment of the message to invalidate from the second node to the local node;

code to release the remote write lock of the named cache at the second node;

code to receive the acknowledgment of the message to invalidate at the local node;

code to determine that no further acknowledgments of the message to invalidate are expected at the local node;

code to send an update of the cache item of the named cache from the local node;

code to receive the update of the cache item and updating the cache item; and code to release the database lock of the named cache.

33. A computer readable medium having computer executable program code stored thereon, the code for cache management in a distributed computer system, the code comprising:

code to identify a cache miss of a cache item at a local node of the distributed computer system;

code to send a request for a read lock of a named cache from the local node to a cache manager of the distributed computer system;

code to receive the request for a read lock of the named cache at the cache manager;

code to read lock the named cache at the cache manager;

code to send an indication that the named cache is read locked from the cache manager to the local node;

code to receive the indication that the named cache is read locked at the local node;

code to request the cache item from a master locking database of the distributed computer system, wherein the first computer, second-computer and master locking database are individuals nodes of the distributed computer system;

code to receive the request for the cache item;

code to send the cache item to the local node;

code to receive the cache item at the local node;

code to send a release of the read lock of the named cache from the local node to the cache manager;

code to receive the release of the read lock of the named cache at the cache manager; and code to release the read lock of the named cache.

34. A programmed computer for cache management in a distributed computer system, comprising:

a memory having at least one region for storing computer executable program code; and a processor for executing the program code stored in memory, wherein the program code comprises:

code to identify a cache miss of a cache item at a local node of the distributed computer system;

code to send a request for a read lock of a named-cache from the local node to a cache manager of the distributed computer system;

code to receive the request for a read lock of the named cache at the cache manager;

code to read lock the named cache at the cache manager;

code to send an indication that the named cache is read locked from the cache manager to the local node;

code to receive the indication that the named cache is read locked at the local node;

code to request the cache item from a master locking database of the distributed computer system, wherein the first computer, second computer and master locking database are individuals nodes of the distributed computer system;

code to receive the request for the cache item;

code to send the cache item to the local node;

code to receive the cache item at the local node;

code to send a release of the read lock of the named cache from the local node to the cache manager;

code to receive the release of the read lock of the named cache at the cache manager; and code to release the read lock of the named cache.

* * * * *